United States Patent
Minca

(10) Patent No.: US 8,033,407 B2
(45) Date of Patent: Oct. 11, 2011

(54) SYSTEM FOR PROVIDING AN INSULATED BOTTLE HAVING A LOCATION TO SECURE A PROTECTIVE NIPPLE TOP WHEN NOT LOCATED TO PROTECT THE NIPPLE

(76) Inventor: Susana Maria Minca, Winter Park, FL (US)

(*) Notice: Subject to any disclaimer, the term of this patent is extended or adjusted under 35 U.S.C. 154(b) by 251 days.

(21) Appl. No.: 12/388,132

(22) Filed: Feb. 18, 2009

(65) Prior Publication Data

US 2010/0206833 A1    Aug. 19, 2010

(51) Int. Cl.
*B65D 8/06*     (2006.01)
*A47J 41/00*   (2006.01)
*A61J 9/08*     (2006.01)

(52) U.S. Cl. .............. 215/13.1; 215/11.6; 62/457.4; 220/592.16

(58) Field of Classification Search ............. 215/11.1, 215/11.6, 13.1, 6, DIG. 7; 220/740, 744, 220/592.16; 62/457.4; 165/80.5
See application file for complete search history.

(56) References Cited

U.S. PATENT DOCUMENTS

| | | | | |
|---|---|---|---|---|
| 730,337 | A * | 6/1903 | Bonnefont | 215/6 |
| 1,429,585 | A * | 9/1922 | Hagerty | 215/11.6 |
| 1,523,152 | A * | 1/1925 | Wolfe | 215/11.6 |
| 2,837,232 | A * | 6/1958 | Rossi | 215/13.1 |
| 2,864,520 | A * | 12/1958 | Pitavy | 215/11.1 |
| 4,076,139 | A * | 2/1978 | Larson | 215/11.6 |
| 4,533,057 | A * | 8/1985 | Klittich | 215/11.3 |
| 5,156,284 | A * | 10/1992 | del Pilar Pla Rodriguez et al. | 215/11.6 |
| D340,991 | S | 11/1993 | Clements | |
| D342,574 | S | 12/1993 | Cervantes et al. | |
| 5,269,426 | A * | 12/1993 | Morano | 215/11.6 |
| D404,821 | S | 1/1999 | Azam | |
| 6,116,439 | A * | 9/2000 | Yaniv | 215/11.1 |
| 7,059,387 | B2 | 6/2006 | Kolowich | |
| 7,172,086 | B2 | 2/2007 | McKendry et al. | |
| 7,185,775 | B1 | 3/2007 | Decal | |
| D546,463 | S | 7/2007 | Potvin | |
| 7,326,234 | B2 * | 2/2008 | Lieberman et al. | 606/236 |
| 2005/0056610 | A1 | 3/2005 | Randolph et al. | |
| 2005/0284835 | A1 | 12/2005 | McKendry et al. | |
| 2006/0060553 | A1 * | 3/2006 | Fleming | 215/11.6 |
| 2008/0251486 | A1 * | 10/2008 | Housley et al. | 215/11.5 |

FOREIGN PATENT DOCUMENTS

FR    2603187 A1 *   3/1988

* cited by examiner

*Primary Examiner* — Sue Weaver
(74) *Attorney, Agent, or Firm* — Terry M. Sanks, Esq.; Beusse Wolter Sanks Mora & Maire, P.A.

(57) ABSTRACT

A thermal bottle including an outer body wall defining a shape of the thermal bottle having a top opening and a bottom end, an inner body wall having an inner volume for a storage area disposed within the inner body and selectively connected to the outer body wall wherein the storage area is accessible through the top opening, a thermal area defined therebetween the outer body wall and the inner body wall, a cover configured to be attachable to at least one of the top opening that prevents removal of a material placed within the storage area, and a securing element located at the bottom end of the outer body wall which is configured to hold the cover when the cover is detached from the top opening.

12 Claims, 4 Drawing Sheets

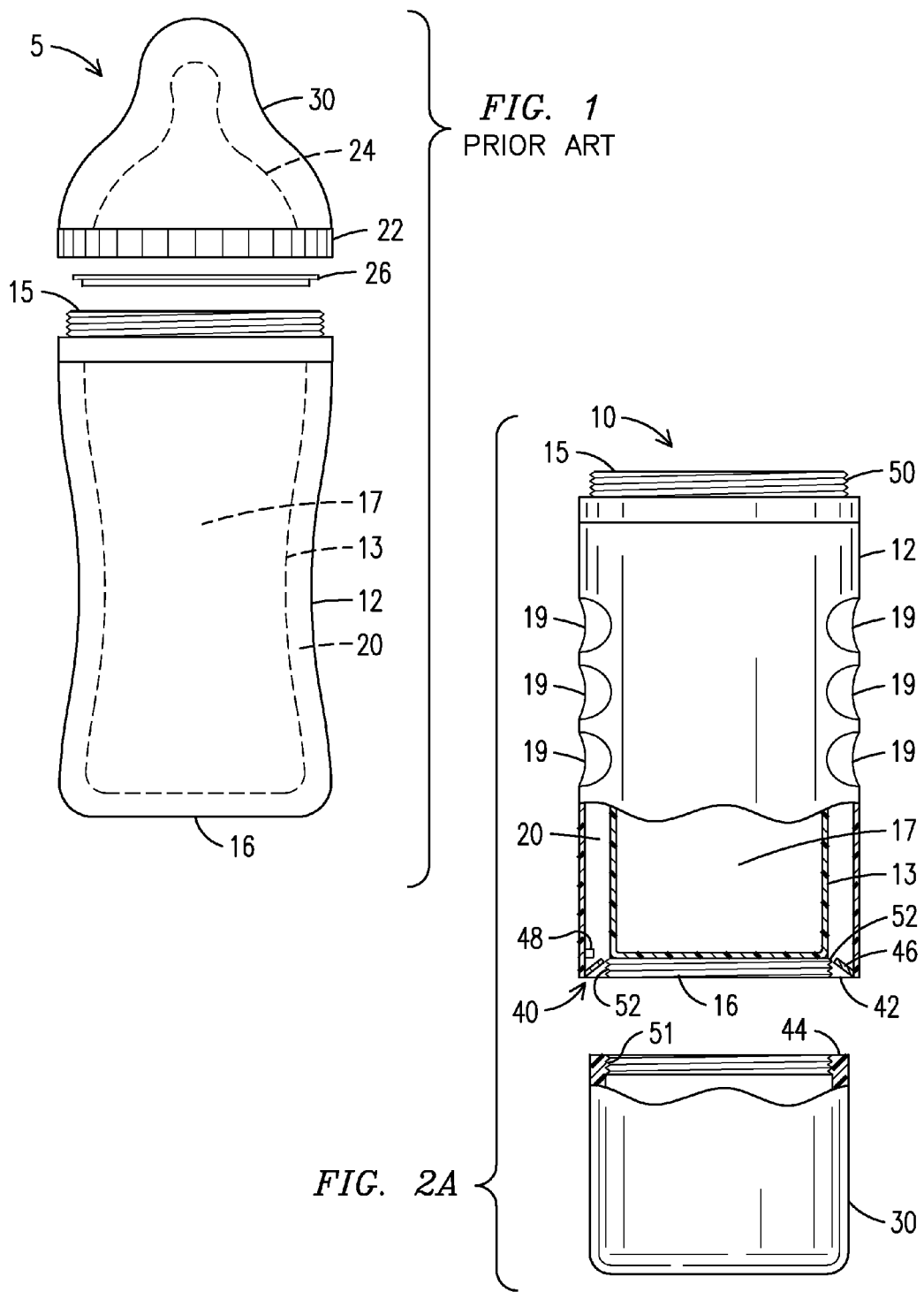

SYSTEM FOR PROVIDING AN INSULATED BOTTLE HAVING A LOCATION TO SECURE A PROTECTIVE NIPPLE TOP WHEN NOT LOCATED TO PROTECT THE NIPPLE

BACKGROUND OF THE INVENTION

This invention relates to containers and, more particularly, to a thermal baby bottle where a nipple cover can be secured to the bottle and material may be added and removed which further affects the thermal characteristic of the baby bottle.

Conventional baby bottles typically have a single wall defining the bottle. When the liquid inside the bottle is warm, this single wall configuration generally does not retain heat well and likewise when the liquid inside the bottle is cold, does not retain cold well. Recent inventions have resulted in development of bottles with insulated walls where a minimum of two layers of material define the insulated walls of the bottle. An insulating material in these recent inventions, disposed therebetween the minimum two layers which define the wall of the bottle, have been either air and/or an insulation material.

FIG. 1 depicts a prior art embodiment of an insulated bottle. As illustrated the bottle 10 has a two layer wall, specifically an outer body wall 12 and an inner body wall 13. The outer body wall 12 defines a shape of the thermal bottle 5. The outer wall 12 has a top opening 15 and a bottom end 16. The inner body wall 13 has an inner volume 17 for a storage area which is disposed within the inner body wall 13 and is accessible through the top opening 15. The inner body wall 13 is selectively connected to the outer body wall 12. A material, such as but not limited to a liquid, is placed within the inner wall. A thermal area 20 is defined therebetween the outer body wall 12 and the inner body wall 13. Either air and/or an insulation material may be placed therebetween the inner wall 13 and the outer wall 12. A ring cap 22 is provided.

Disposed therethrough the ring cap 22 is a nipple 24. Beneath the nipple 24 is a seal disk 26 which prevents a liquid within the inner wall 13 from reaching the nipple 24 and possibly releasing from the nipple 22 when the bottle 5 is not being used. To protect the nipple 24, such as but not limited to remaining sanitized, a nipple cover, or cover 30, is provided. The cover 30 is attachable and detachable from the bottle wall 12, 13 and/or ring cap 22.

Even though a thermal bottle usually provides for a cover to protect the nipple, when the cover is removed there is no location on the thermal bottle to secure the cover. Manufacturers and users of thermal bottles would benefit from a thermal bottle design that further provides for securing a cover when the cover is removed.

BRIEF DESCRIPTION OF THE INVENTION

A thermal bottle including an outer body wall defining a shape of the thermal bottle having a top opening and a bottom end. An inner body wall having an inner volume for a storage area disposed within the inner body and selectively connected to the outer body wall wherein the storage area is accessible through the top opening is also provided. A thermal area defined therebetween the outer body wall and the inner body wall, and a cover configured to be attachable to at least one of the top opening that prevents removal of a material placed within the storage area are also provided. Also disclosed is a securing element located at the bottom end of the outer body wall which is configured to hold the cover when the cover is detached from the top opening.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which:

FIG. 1 depicts an illustration of a prior art embodiment of a thermal bottle;

FIG. 2A depicts an illustration of an exemplary embodiment of a thermal bottle having a location for retaining a cover;

DETAILED DESCRIPTION OF THE INVENTION

Figures 2B, 2C:
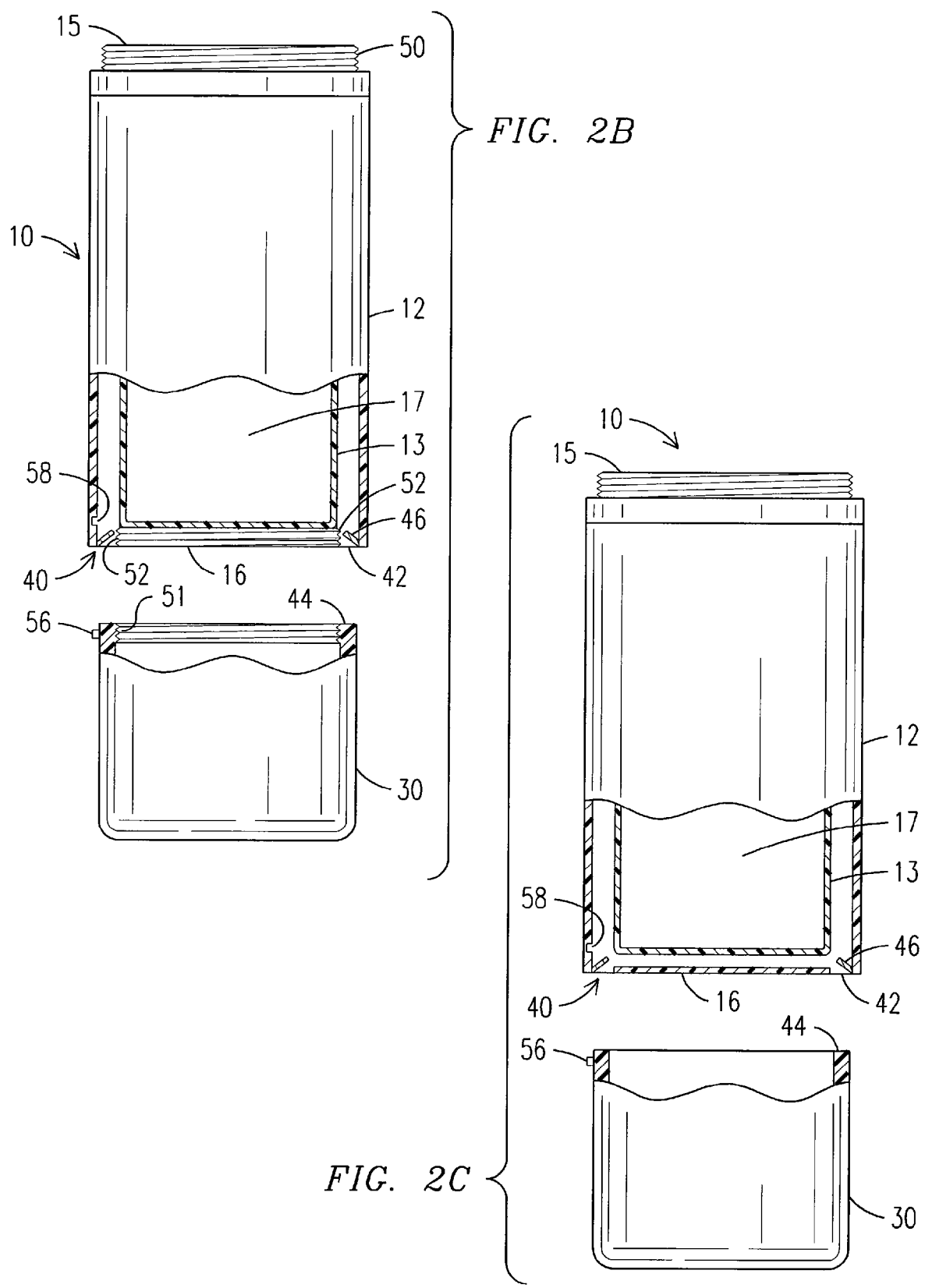
FIG. 2B depicts an illustration of an exemplary embodiment of a thermal bottle with one exemplary embodiment of a locking mechanism.
FIG. 2C depicts an illustration of an exemplary embodiment of a thermal bottle with another exemplary embodiment of a locking mechanism.

Reference will now be made in detail to the embodiments consistent with the invention, examples of which are illustrated in the accompanying drawings. Wherever possible, the same reference numerals used throughout the drawings refer to the same or like parts.

Though exemplary embodiments of the present invention are described with respect to baby bottles, those skilled in the art will readily recognize that embodiment of the invention are applicable to other containers as well. Therefore applying a top securing location to baby bottles should not be viewed as limiting.

FIG. 2A depicts an illustration of an exemplary embodiment of a cross section of a thermal bottle having a location for retaining a cover. A securing element 40 is located at the bottom end 16 of the outer body wall 12 which is configured to hold the cover 30 when the cover 30 is detached from the top opening 15. As illustrated the securing element 40 has an opening 42 formed through the bottom end 16 of the outer body wall 12. The opening 42 is provided to receive a bottom end 44 of the cover 30. A movable seal 46 is located within the opening 42.

In operation, when the cover 30 is not placed within the opening 42, the movable seal 46 is in a naturally closed position, closing off the opening 42 and providing an enclosed thermal area within the walls 12, 13. When the cover 30 is placed within the opening 42, the seal 46 is pushed out of the way or displaced from closing the opening 42. Once within the opening 42, the cover 30 is locked in place with a locking mechanism 48. This locking of the cover 30 to the bottle 10 may be accomplished a plurality of ways. As further illustrated in FIG. 2, the top of the cover 30 has a flat surface. When connected to the opening 42, by having the flat surface, the bottle may be positioned on a flat surface.

FIG. 2B depicts an illustration of an exemplary embodiment of a thermal bottle with one exemplary embodiment of a locking mechanism. In this exemplary example, the cover 30 is attached to the top of the bottle 10 with a screw cap assembly 50, 51. When inserted in the opening 42, the screw cap assembly part 51 of the cover 30 is received by a receiving screw cap assembly 52.

FIG. 2C depicts an illustration of an exemplary embodiment of a thermal bottle with another exemplary embodiment of a locking mechanism. In this exemplary embodiment, a notch 56 may be formed on the cover 30. When inserted in the opening 42, the cover 30 may be twisted where the notch 56 is secured in a receiving element 58. In another exemplary embodiment, the receiving element 58 is a detent located on the outer bottle wall and a notch is provided on the cover to engage the detent. When the detent 60 is released, the cover 30 can be removed. In another embodiment, the locking device connects to the cover upon insertion, or in other words, the cover does not have to be twisted. To minimize time required to secure the cover 30, if an embodiment requiring screwing is used, twisting less than a quarter of a rotation is preferred. However those skilled in the art will readily recognize that providing for more than a quarter rotation of screwing may also work.

Figures 3, 4A:
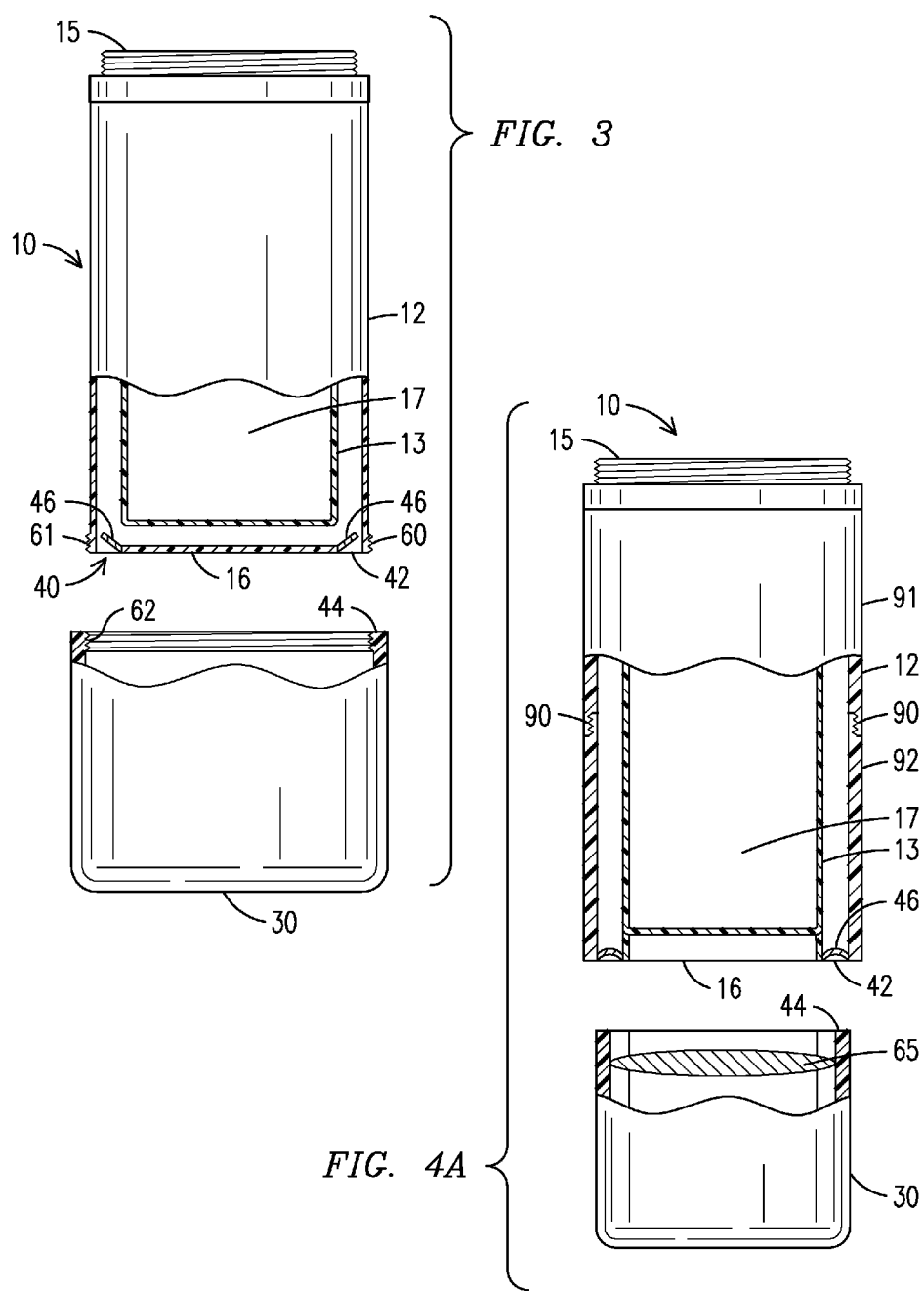
FIG. 3 depicts an illustration of another exemplary embodiment of a thermal bottle having a location for retaining a cover.
FIG. 4A depicts another exemplary embodiment of a thermal bottle having a location for the retaining a cover.

FIG. 3 depicts an illustration of another exemplary embodiment of a thermal bottle having a location for retaining a cover. In this embodiment, the cover 30 has a diameter greater than a diameter of the outer body wall 12. A securing element 61 is located on an outer perimeter of the outer body wall 12 at the bottom end 16 of the bottle 10. The cover 30 has a receiving section 62 for connecting the securing element 61. For example, the receiving section 62 may be a part of the screw cap assembly, and the securing element 61 is a receiving screw cap assembly.

Figure 4B:
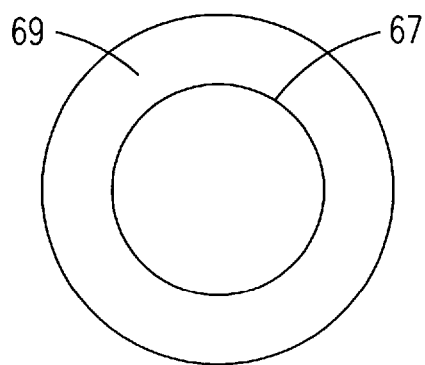
FIG. 4B depicts an exemplary embodiment of a bottom end of the thermal bottle having a location for the retaining a cover.
Figure 4C:
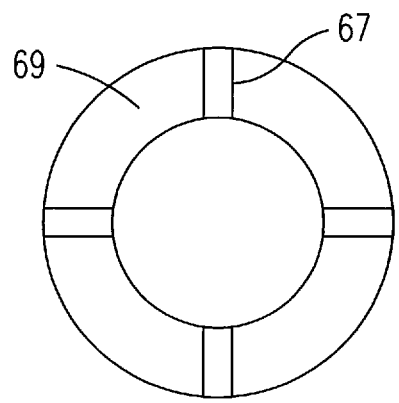
FIG. 4C depicts another exemplary embodiment of a bottom end of the thermal bottle having a location for the retaining a cover.

FIG. 4A depicts another exemplary embodiment of a thermal bottle having a location for the retaining a cover and FIG. 4B depicts an exemplary embodiment of the bottom of the thermal bottle. As is further illustrated, a thermal stopper 65 is provided to secure a material within the inner body wall 13. The stopper 65 has a defined thickness to provide for its thermal characteristic. When the cover 30 and stopper 65 are both removed from the top 15 of the bottle 10, the stopper 65 is placed in an area of the cover 30 provided to encase the nipple 24. An area may be provided in the bottom end of the thermal bottle 10 to receive the stopper 65 should the cover 30 not be of a height to provide for securing the stopper 65 within the cover 30 when the cover is secured to the bottom end, as disclosed above. In another exemplary embodiment as illustrated in FIG. 4B, an area is provided in the bottom end 16 of the thermal bottle 10 which may be pressed into the thermal area 20 to provide additional room for the stopper 65. This area may be a flexible area that moves into the thermal area 20 when pressed and then returns to a position of not extending into the thermal area 20 when not pressed. This flexible area may have a solid area 67 with a flexible material 69 surrounds the solid area. In another exemplary embodiment the flexible material 69 is part of the seal 46. In another exemplary embodiment, the solid area may have parts that extend to be contiguous to the outer side wall and the flexible material is in place where the solid area is not provided, such as is illustrated in FIG. 4C.

Figure 5A:
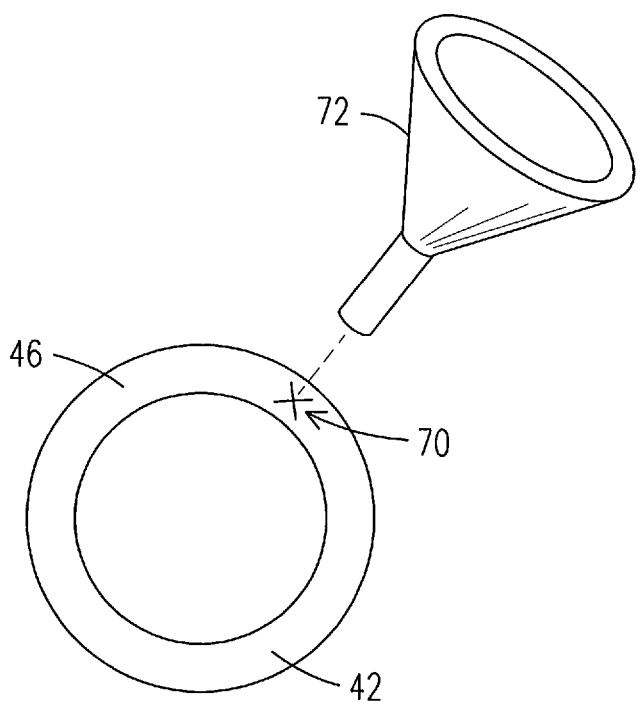
FIG. 5A depicts an illustration of an exemplary embodiment for providing a material to enhance a thermal characteristic of a thermal bottle.
Figure 5B:
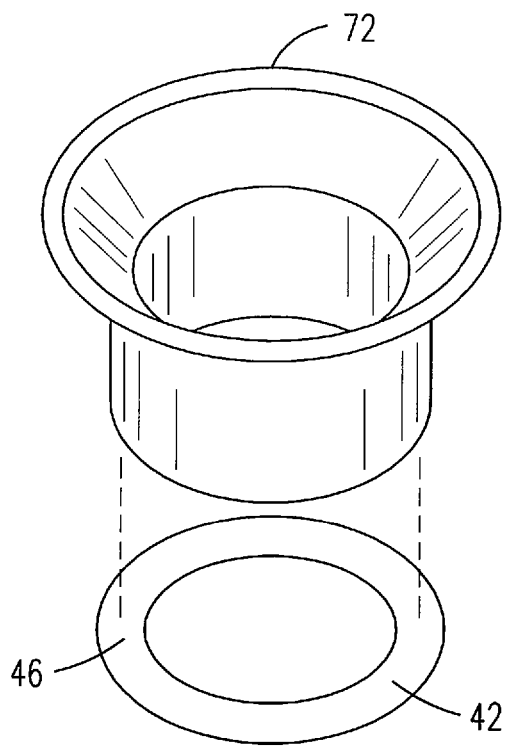
FIG. 5B depicts an illustration of an exemplary embodiment for providing a material to enhance a thermal characteristic of a thermal bottle.

FIGS. 5A and 5B depict an illustration of an exemplary embodiment of a bottom of the thermal bottle for providing a material to enhance a thermal characteristic of a thermal bottle. The movable seal 46 has a receiving location 70 through which the material may be inserted into the thermal area 20. The material may be a warm liquid and/or a cool liquid. For example, if the thermal bottle 10 is being used to keep contents of the bottle warm, if a significant amount of time has passed, where the natural characteristics of the thermal bottle 10 are not maintaining the warmth over time, warm liquid, such as but not limited to warm water or hot water, may be placed in the thermal area 20 between the inner wall body 13 and the outer wall body 12. Similarly, cold water may be used if the intent is to keep the contents of the bottle cool. In an exemplary embodiment, a funnel device 72 is attachable to the receiving location for placement of the thermal material within the thermal area. For example, since the seal 46 covering the opening 42 is a flexible material, a tip of the funnel 72 may be pressed into the opening 42 at a location that may be configured to accept the tip, or at any location along the seal 46. As illustrated in FIG. 5B, the funnel device 72 may fit into the seal 46 just as the cover 30 does. This funnel device 72 has an opening through which the thermal material may be poured into. The top end of this funnel device 72 may have a flared end to insure that the material does not spill.

In another exemplary embodiment, also illustrated in FIG. 4A, the bottle may be separated into two halves 91, 92. The separation technique is not limited to one technique. For example, both halves have a threaded section 90 that allow for the halves to be threaded together. As illustrated the outer sidewall 12 are separated whereas the inner sidewall 13 remains intact. In this configuration, the thermal area 20 may be further exposed to air, especially when the thermal material is liquid-based.

Furthermore, though exemplary embodiments of the invention are illustrated herein with baby bottle having a particular outer body wall shape 12, the invention is applicable with a plurality of body wall shapes, even the body wall shape illustrated in FIG. 1. For body wall shapes that are not readily designed to accommodate hands of an infant or user of the bottle, a means may be provided, such as but not limited to indentures 19 and/or a handle, to assist the user with holding the bottle.

While exemplary embodiment of the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A thermal bottle comprising:
   an outer body wall defining a shape of the thermal bottle having a top opening and a bottom end;
   an inner body wall having an inner volume for a storage area disposed within the inner body wall and selectively connected to the outer body wall wherein the storage area is accessible through the top opening;
   a thermal area defined therebetween the outer body wall and the inner body wall;
   a movable seal configured to provide an opening to the thermal area when displaced, the opening being configured as a receiving location through which a liquid-based thermal material may be inserted into the thermal area;
   a funnel device configured to displace the movable seal for placement of the thermal material within the thermal area, the movable seal returning to a sealed configuration when the funnel device ceases to displace the movable seal;
   a cover configured to be attachable to the top opening that prevents removal of a material placed within the storage area; and
   a securing element located at the bottom end of the outer body wall which is configured to hold the cover when the cover is detached from the top opening.

2. The thermal bottle according to claim 1, further comprising a securing ring configured to attach to the top opening.

3. The thermal bottle according to claim 2, further comprising a nipple element configured to be secured to the top opening with the securing ring wherein the nipple is secured in an opening formed therethrough the securing ring.

4. The thermal bottle according to claim 3, further comprising a thermal stopper configured to prevent material located in the storage area from at least one of reaching the nipple element and passing past the cover.

5. The thermal bottle according to claim 1, wherein the securing element further comprises:
   an opening formed through a bottom end of the outer body wall and configured to receive the bottom end of the cover;
   the movable seal configured to close the opening when the cover is not placed within the opening; and
   a locking element that holds the cover in place when the cover is received.

6. The thermal bottle according to claim 5, wherein the cover further comprises a receiving element which engages the locking element.

7. The thermal bottle according to claim 5, wherein the locking element is engaged by turning the cover less than twenty-five percent of a rotation.

8. The thermal bottle according to claim 1, further comprising the liquid-based thermal material which may be placed within the thermal area.

9. The thermal bottle according to claim 8, wherein the thermal material is at least one of a warm liquid and a cool liquid.

10. The thermal bottle according to claim 8, wherein the outer body wall is separated into at least two parts so that the thermal area is further exposed to air when the outer body wall is separated.

11. The thermal bottle according to claim 1, wherein the cover has a diameter greater than a diameter of the outer body wall and wherein the securing element is located on an outer perimeter of the outer body wall at a bottom end of the outer body wall from the top opening.

12. The thermal bottle according to claim 1, further comprises a means to assist a user to hold the thermal bottle.

* * * * *